June 24, 1958  A. JOVIS  2,840,129
MUFFIN TEARING DEVICES
Filed June 28, 1956
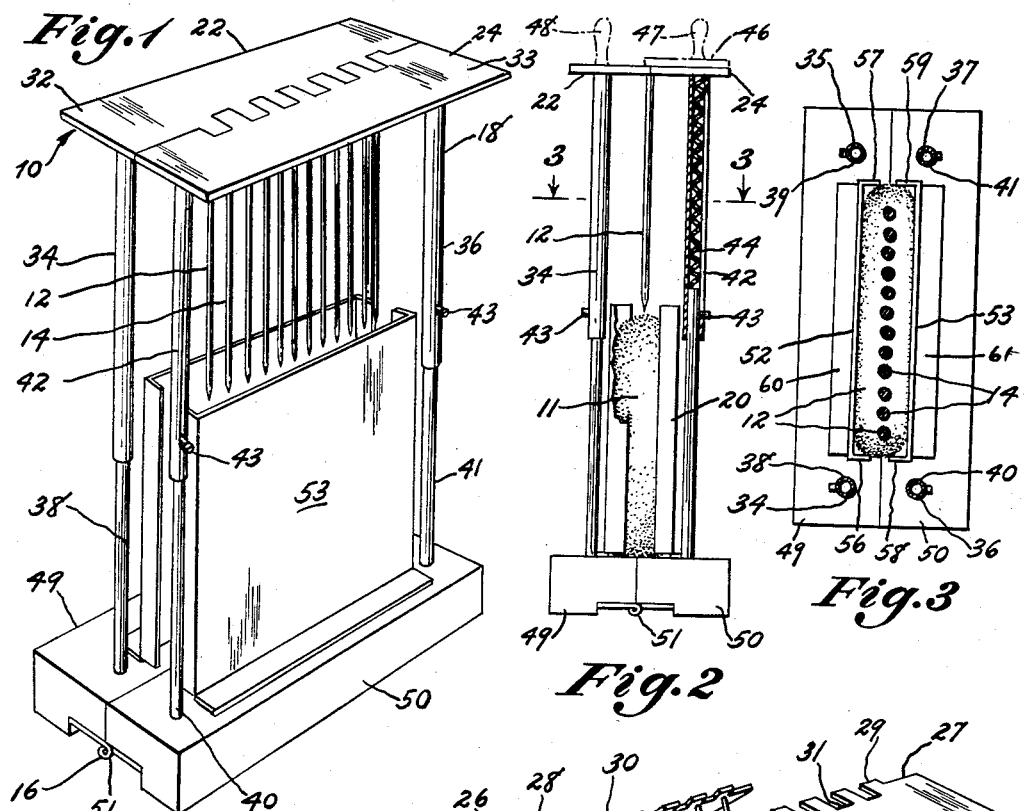
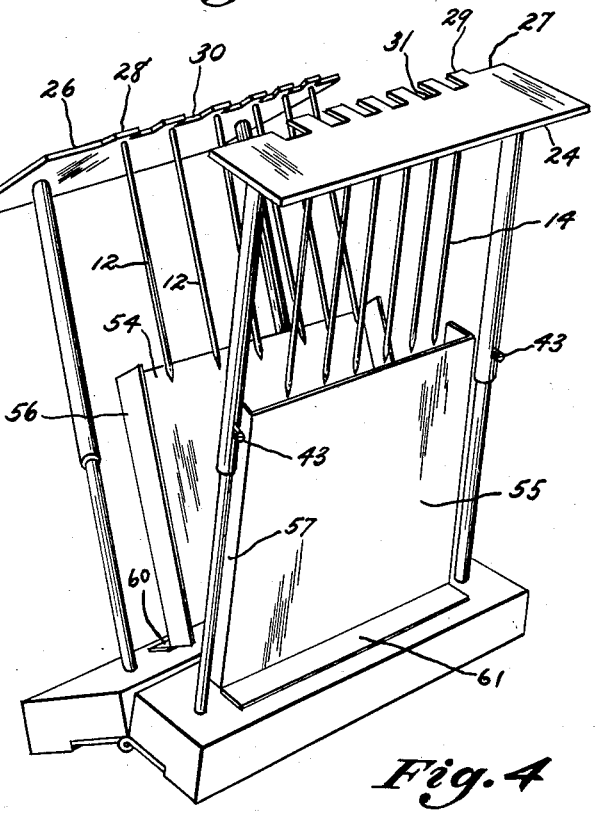
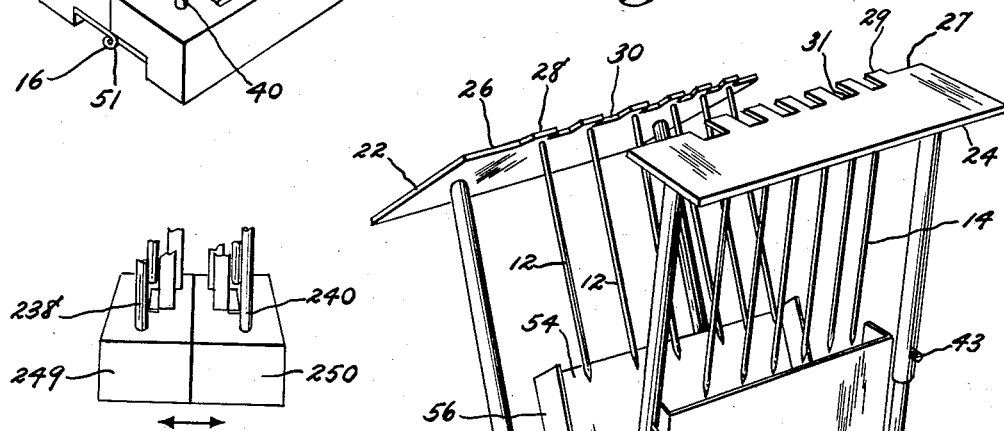
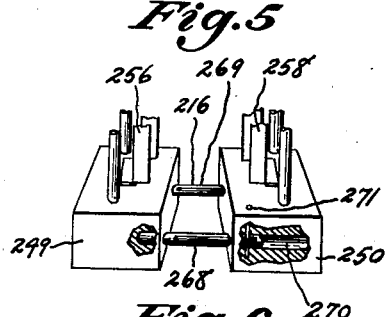

United States Patent Office 2,840,129
Patented June 24, 1958

2,840,129
MUFFIN TEARING DEVICES

Arthur Jovis, New York, N. Y.

Application June 28, 1956, Serial No. 594,617

4 Claims. (Cl. 146—72)

This invention relates generally to food preparation and more particularly to improved devices for tearing apart breadstuffs, such as, rolls, scones, muffins, etc.

Certain foods composed of fully or partially baked dough are prepared by further exposure to high heat. These may include but are not limited to small breads, such as, English muffins, buns and bread.

It is common practice today to keep baked goods frozen, prior to use. Such freezing not only prevents spoilage and decay but also retains in the baked goods, the desired moisture content.

Frozen baked goods are often prepared by suddenly exposing the same to high heat. This results not only in toasting of the exposed surfaces of the food but also in rapid thawing as well.

When it is desired to cut frozen baked goods, the hardness of the frozen food makes this difficult. Frequently sawing is resorted to but this is inconvenient and difficult.

Where the article of food is to be toasted as for example in the case of an English muffin or Scotch scone or cornbread, it is highly desirable and it is invariably stressed by the producers that the muffin be torn instead of cut, as this provides a rough "crumbly" surface more suitable for toasting and results in a superior food item.

While the producers of such items as English muffins recommend that they be torn apart (not cut apart) before toasting, this usually is not carried out in practice, since no mechanism or other device has been offered to the public to achieve this end, and it requires considerable skill and patience to tear apart a muffin by hand. The time element involved in tearing is important, particularly at a busy lunch counter or other food service. Even if the tearing is done by a skillful operator the resulting halves of the muffin are usually unequal in thickness and are uneven and lumpy. This results in a muffin which because of the lumps and unevenness, when toasted is charred in one part and underdone in another. Furthermore the lumpiness of the torn muffin frequently is such that the muffin will not fit properly in the toaster aperture. This interferes with the proper functioning of the mechanism of the automatic toasters (so much in use today) and results in burnt toasts. The end result of the foregoing difficulties is that the consumer usually disregards the instruction to "tear" the muffin (or other foodstuff) and slices it in half with a knife. He thereby not only sacrifices the desirable "crumbly" texture on the torn surface of the muffin or other foodstuff but also frequently slices the breadstuff in such a manner that (a) the two halves are not equal to each other in thickness, and, (b) neither half is of uniform thickness.

I claim for my device that it will produce

(1) A uniformly crumbly surface on the torn surface of the article.

(2) That it will produce two halves each of equal thickness so that each half will toast equally with the other.

(3) That each half will be of uniform thickness without lumps and therefore will toast evenly without charring or interfering with the toaster mechanism.

(4) That it saves time for the user particularly if pretorn at the bakery and delivered to the consumer ready for toasting.

It is therefore among the objects of the present invention to provide devices for separating, by breaking or tearing, dough food articles.

Another object herein lies in the provision of structure of the class described which is compact and efficient in use and which is quick and easy to use.

A further object is to provide devices of the class described which are simple in construction so that they may be manufactured in large scale at low cost, to have a consequent wide distribution and use.

A feature of the invention is that the devices are readily cleaned so that they may be conveniently maintained in a sanitary condition.

These objects and other incidental ends and advantages will more fully appear in the progress of this disclosure and be pointed out in the appended claims.

In the drawings in which similar reference characters designate corresponding parts throughout the several views:

Figure 1 is a perspective view of a first embodiment of the invention.

Figure 2 is an end elevational view of Figure 1 with an alternate handle structure shown in dot-dash lines.

Figure 3 is a horizontal sectional view as seen from the plane 3—3 on Figure 2.

Figure 4 is a perspective view with the device of Figure 1 in a partially opened position.

Figure 5 is a fragmentary perspective view of a second embodiment of the invention.

Figure 6 is a fragmentary perspective view corresponding to Figure 5 but showing the parts in an open position.

Turning now to Figures 1 to 4, inclusive, the first embodiment of the device, generally indicated by reference character 10 comprises broadly: first piercing elements 12; second piercing elements 14; lateral shifting means 16; axial shifting means 18, and food supporting means 20.

The first and second piercing elements 12 and 14 are preferably in the form of rod-like tine members which are pointed at their free ends and at their relatively fixed ends are connected to the upper carriages 22 and 24, respectively. The carriages 22 and 24 at their meeting edges 26 and 27 and are provided with projections and indentations 28 and 29, 30 and 31, respectively, which are in staggered arrangement so that when the first and second piercing elements are in the closed position thereof (Figures 1–3 inclusive) the tine members are arranged substantially in a row.

The carriages 22 and 24 include the piercing element support plates 32 and 33, and these are in turn mounted upon the guide tubes 34 and 35, 36 and 37, respectively, which ride upon the rods 38—41. The tubes 34—37 are provided with elongated slots 42, and the rods 38—41 are provided with set screws 43 which in striking the ends of said slots limit the upward and downward travel of the carriages 22 and 24. Disposed within the tubes 34—37 are helical expansive springs 44, only one of which is seen in Figure 2. The springs 44 serve to urge the carriages 22 and 24 to their uppermost positions, as seen in Figures 1 and 2. As indicated by the dot-dash lines in Figure 2, there may be secured to one of the carriages a coupling member 46. In Figure 2, the coupling member 46 is connected to the carriage 24 so that it overhangs carriage 22, so that downward pressure upon the carriage 24 on the handle 47 will cause both carriages to descend. The carriage 22 may be provided with a member (not shown) like the member 46 or a simple handle 48.

The lateral shifting means 16 includes a pair of base elements 49 and 50 which are movably associated with each other, as for example in a pivotal manner, by the hinge 51. The lower ends of the rods 38—41 are secured to the base elements 49 and 50.

The food supporting means includes the pocket members 52 and 53. The pocket members 52 and 53 include main walls 54 and 55, end flanges 56—59, and bottom flanges 60 and 61. The bottom flanges are secured to the base elements 49 and 50.

In use, for example, a baked food product 11 or the like, such as an English muffin may be placed between the pocket members 52 and 53 when the device 10 is in an opened position (Figure 4). The device is then closed to the position shown in Figures 1-3. Following the downward motion pressure may be applied upon the plates 32 and 33 or by pressure upon the coupling member 46. This will cause the piercing elements to penetrate the food product in a manner indicated in Figure 3. When the carriages 22 and 24 have reached their lowermost position, the points of the piercing elements 12 and 14 are disposed just above the upper surfaces of the bases 49 and 50. While the carriages 22 and 24 are in their lowest positions, the said carriages are moved apart about the axis of the hinge 51, this causes the sets of first and second piercing elements 12 and 14 to separate and they tear or break the portions of the muffin 11 which lie between said piercing elements. When the piercing elements now rise under the action of the springs 44, they release the two halves of the muffin 11 which may be conveniently removed by opening the device (Figure 4) and it will be found to have rough or corrugated surfaces.

Turning to the embodiment shown in Figures 5 and 6, to avoid needless repetition certain of the parts thereof corresponding to the first embodiment are given the same reference characters with the prefix "2." The second embodiment differs principally in the means 216 which comprises a pair of slotted round bars 268 and 269, which slide within the suitable bores 270, and movement is limited by the pin 271. This structure affords a straight guided movement of the bases 249 and 250 and their associated parts.

It may be noted that the present devices may be used for forming the spaced elongated holes in the food by forcing the tines into the foodstuff and withdrawing them without going through the process of tearing the foodstuff. The purpose thereof is to prepare the item for easy tearing by hand so as to produce a uniform surface and thickness if the manual operation is preferred, and the actual tearing, breaking, or separating may be preformed at a later time.

The present invention may be used generally in two principal ways: The invention may be incorporated in an automatic mechanical operation whereby the muffins are fed into the "tearer aparter" at the bakery where they are produced, and are there packaged automatically as a part of the entire production process, in conjunction with tearing apart and then sold (already separated) to the housewife or to the lunch counter, hamburger stand, etc. ready for toasting. Or, a simple version of the "tearer aparter" for sale to the housewife, lunch counter, etc. to be used by them individually.

I wish it to be understood that I do not desire to be limited to the exact details of construction shown and described, for obvious modifications will occur to a person skilled in the art to which the present invention pertains.

I claim:

1. A muffin tearing device comprising first and second base elements, hinge means interconnecting said first and second base elements, first and second guide rods extending upwardly of each of said base elements, first and second carriages slideably disposed for limited reciprocation upon said guide rods; said carriages each having meeting edges provided with mating projections and indentations, said projections having tine members thereon so disposed as to lie in substantially coplanar relation when said carriages are in abutted position, and in non-coplanar relation upon movement of said base elements about said hinge means.

2. A muffin tearing device comprising first and second base elements, hinge means interconnecting said first and second base elements, first and second guide rods extending upwardly of each of said base elements, first and second carriages slideably disposed for limited reciprocation upon said guide rods; said carriages each having meeting edges provided with mating projections and indentations, said projections having tine members thereon so disposed as to lie in substantially coplanar relation when said carriages are in abutted position and in non-coplanar relation upon movement of said base elements about said hinge means; and a muffin supporting pocket member mounted upon at least one of said bases for positioning a muffin in coplanar relation with respect to said tine members.

3. A muffin tearing device comprising first and second base elements, hinge means interconnecting said first and second base elements, first and second guide rods extending upwardly of each of said base elements, first and second carriages slideably disposed for limited reciprocation upon said guide rods; said carriages each having meeting edges provided with mating projections and indentations, said projections having tine members thereon so disposed as to lie in substantially coplanar relation when said carriages are in abutted position, and in non-coplanar relation upon movement of said base elements about said hinge means; and a pair of muffin supporting members mounted upon said bases for positioning a muffin in coplanar relation with respect to said tine members.

4. A muffin tearing device comprising first and second base elements, hinge means interconnecting said first and second base elements, first and second guide rods extending upwardly of each of said base elements, first and second carriages slideably disposed for limited reciprocation upon said guide rods; said carriages each having meeting edges provided with mating projections and indentations, said projections having tine members thereon so disposed as to lie in substantially coplanar relation when said carriages are in abutted position, and in non-coplanar relation upon movement of said base elements about said hinge means; a pair of muffin supporting members mounted upon said bases for positioning a muffin in coplanar relation with respect to said tine members; and resilient means for urging said carriages along said rods in a direction away from said base elements.

References Cited in the file of this patent

UNITED STATES PATENTS

| | | |
|---|---|---|
| 1,858,790 | Schneider | May 17, 1932 |
| 2,472,354 | Waters | June 7, 1949 |

FOREIGN PATENTS

| | | |
|---|---|---|
| 94,408 | Sweden | Jan. 26, 1939 |
| 145,284 | Sweden | Mar. 4, 1954 |